(12) United States Patent
Stratton et al.

(10) Patent No.: US 10,248,133 B2
(45) Date of Patent: Apr. 2, 2019

(54) METHOD AND SYSTEM FOR MAPPING TERRAIN AND OPERATING AUTONOMOUS MACHINES USING MACHINE PARAMETERS

(71) Applicant: Caterpillar Inc., Peoria, IL (US)

(72) Inventors: Kenneth L. Stratton, Dunlap, IL (US); Jeffrey Edward Jensen, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 328 days.

(21) Appl. No.: 15/181,302

(22) Filed: Jun. 13, 2016

(65) Prior Publication Data

US 2016/0282878 A1    Sep. 29, 2016

Related U.S. Application Data

(63) Continuation-in-part of application No. 13/169,318, filed on Jun. 27, 2011, now Pat. No. 9,378,663.

(51) Int. Cl.
| | |
|---|---|
| *G05D 1/02* | (2006.01) |
| *G05D 1/00* | (2006.01) |
| *E02F 9/26* | (2006.01) |
| *G09B 25/06* | (2006.01) |
| *G09B 25/08* | (2006.01) |
| *B60P 1/04* | (2006.01) |
| *E02F 9/20* | (2006.01) |
| *G05B 11/01* | (2006.01) |

(52) U.S. Cl.
CPC ............. *G05D 1/0274* (2013.01); *B60P 1/04* (2013.01); *E02F 9/205* (2013.01); *E02F 9/2045* (2013.01); *E02F 9/2054* (2013.01); *E02F 9/262* (2013.01); *G05B 11/01* (2013.01); *G05D 1/0088* (2013.01); *G05D 1/0219* (2013.01); *G09B 25/06* (2013.01); *G09B 25/08* (2013.01)

(58) Field of Classification Search
USPC ............................................................ 702/5
See application file for complete search history.

(56) References Cited

U.S. PATENT DOCUMENTS

| | | | |
|---|---|---|---|
| 4,484,284 | A | 11/1984 | Tagami et al. |
| 6,085,130 | A | 7/2000 | Brandt et al. |
| 6,847,887 | B1 | 1/2005 | Casino |
| 7,113,105 | B2 | 9/2006 | Sahm et al. |
| 7,222,004 | B2 | 5/2007 | Anderson |

(Continued)

FOREIGN PATENT DOCUMENTS

DE    10 2009 015 161 A1    9/2010

*Primary Examiner* — Paul D Lee

(57) ABSTRACT

A system for mapping terrain using at least a first machine and a second machine traveling along the terrain includes a controller for each of the respective first and second machines. Each respective machine includes a plurality of sensors in electrical communication with the controller of each respective machine. The controller is configured to receive, from the plurality of sensors located on each respective machine a plurality of machine parameters indicative of sensed operations of the respective machine as the respective machine travels along the terrain. The controller is further configured to determine, based on the received machine parameters for the respective machine, a geometry and a grade of a plurality of paths on the terrain along which the respective machine travels.

20 Claims, 13 Drawing Sheets

(56) References Cited

U.S. PATENT DOCUMENTS

| | | |
|---|---|---|
| 2004/0158355 A1 | 8/2004 | Holmqvist et al. |
| 2008/0208393 A1* | 8/2008 | Schricker .................. G08G 1/20 |
| | | 701/1 |
| 2008/0208415 A1 | 8/2008 | Vik |
| 2009/0099707 A1 | 4/2009 | Greiner et al. |
| 2009/0154992 A1* | 6/2009 | Greiner .................. G06Q 10/06 |
| | | 404/72 |
| 2009/0202109 A1 | 8/2009 | Clar et al. |
| 2010/0145609 A1 | 7/2010 | Boss et al. |
| 2010/0198466 A1 | 8/2010 | Eklund et al. |
| 2010/0198508 A1 | 8/2010 | Tang |
| 2010/0245169 A1 | 9/2010 | O'Connor |

* cited by examiner

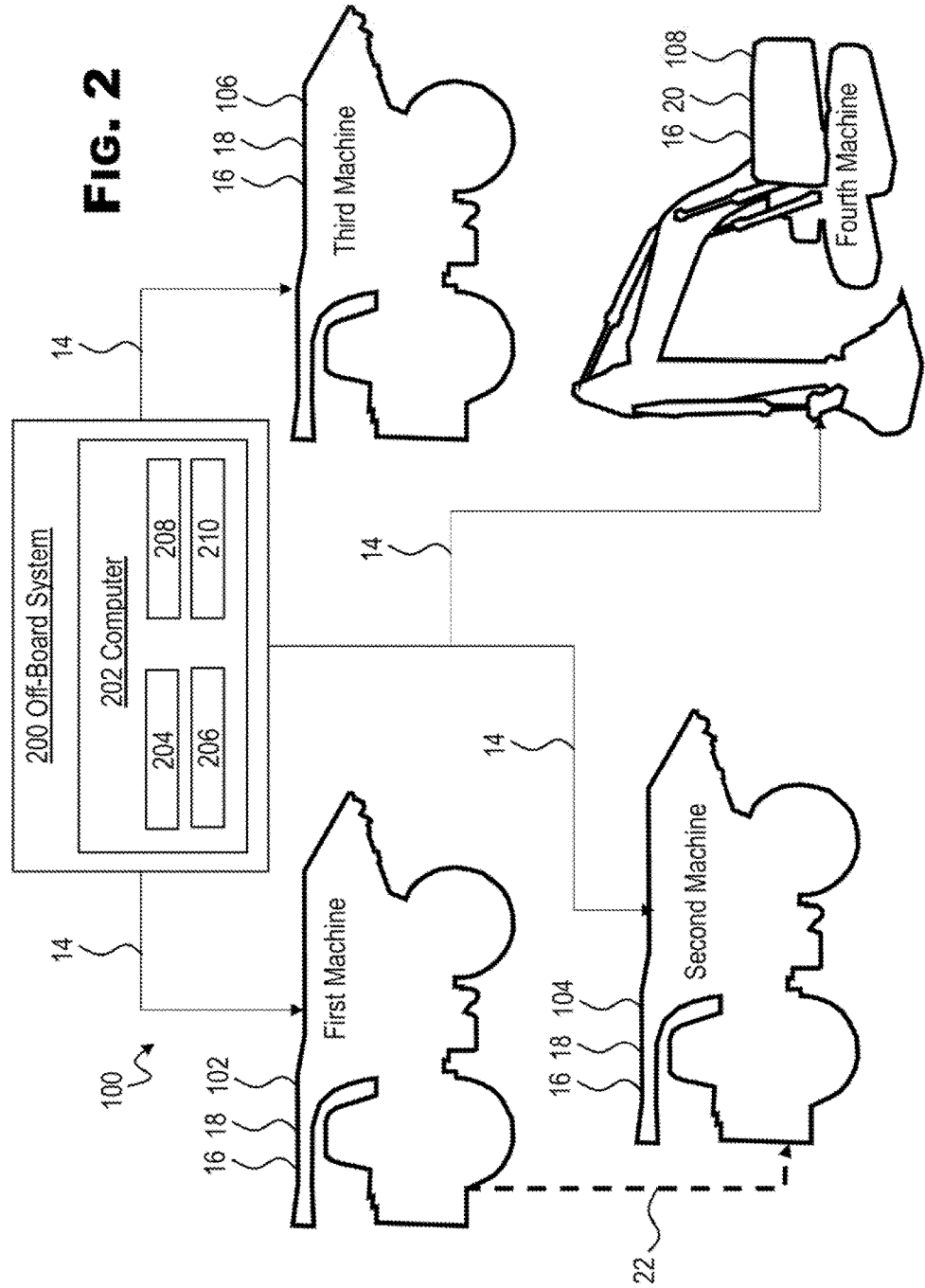

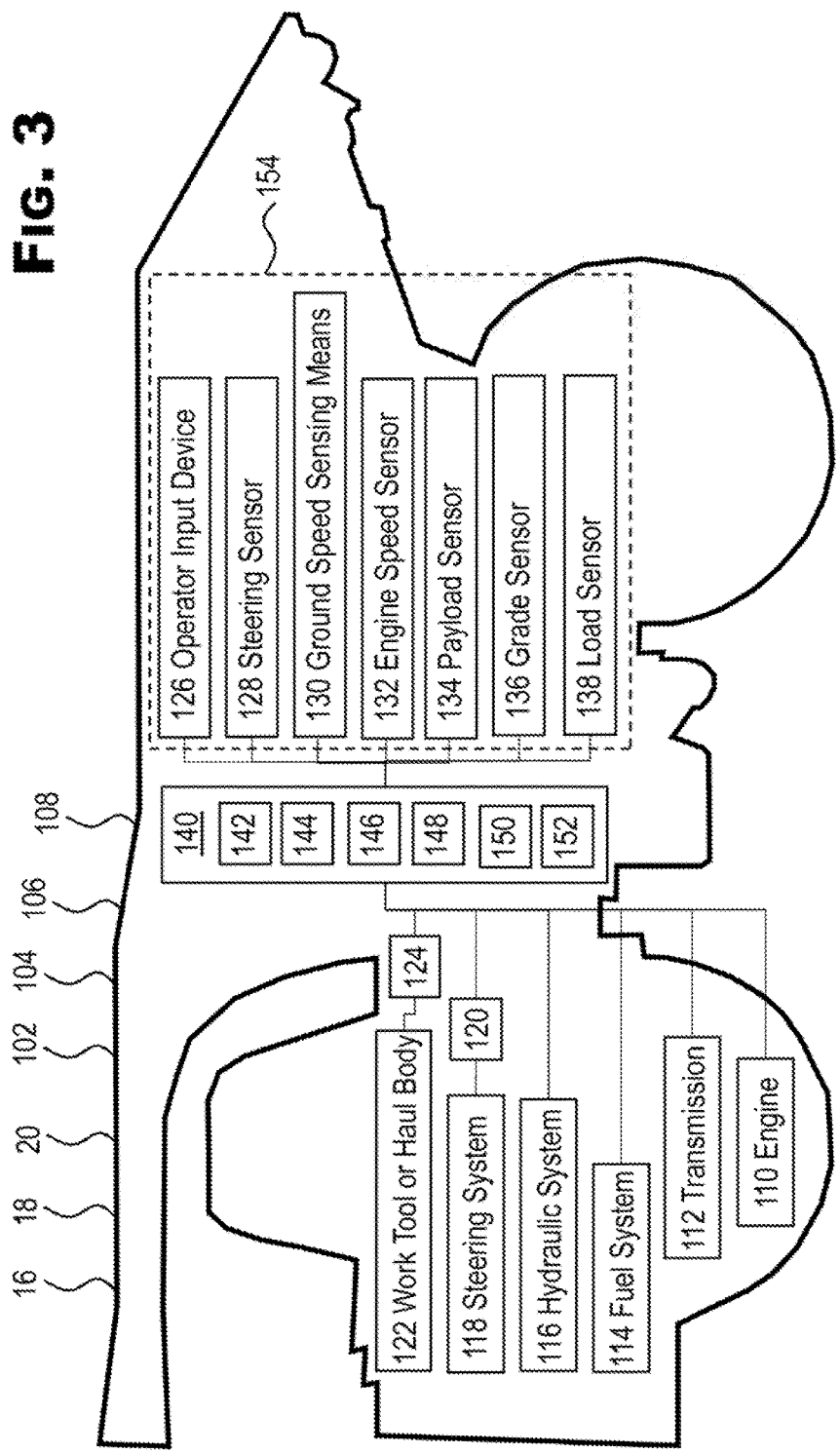

METHOD AND SYSTEM FOR MAPPING TERRAIN AND OPERATING AUTONOMOUS MACHINES USING MACHINE PARAMETERS

PRIORITY

This application claims priority to U.S. Provisional patent application Ser. No. 13/169,318, entitled "Method and System for Mapping Terrain Using Machine Parameters", and filed Jun. 27, 2011.

TECHNICAL FIELD

The present disclosure relates generally to a method and system for mapping terrain, and more particularly, to a method and system for mapping terrain using machine parameters.

BACKGROUND OF THE INVENTION

Worksites, such as, for example, mine sites, landfills, quarries, construction sites, etc., commonly undergo geographic alteration by machines and/or workers performing various tasks thereon. For example, at a coal mining site, mounds of coal are continually moved by dozers, excavators, and/or other digging machines about the site. Haul trucks or other similar machines may transport the coal or other mined material for processing. On many sites, digging machines are matched with appropriate hauling machines for maximum productivity and/or efficiency. These hauling machines may travel on several paths from a digging site where they are loaded, to a dumping site where they are unloaded. Some work sites employ autonomous or semi-autonomous machines. These machines may be operated without an operator in the machine, or control systems on the machines may perform some operations without input from an operator.

To allow autonomous, or semi-autonomous machines to traverse paths or roads on a work site, the terrain of the worksite may be digitally mapped in a digital site map. The digital site map may be contained in a memory component in a controller of a machine. The digital site map may be updated by the controller of the machine, a transmission of terrain changes from another machine, and/or an off-board transmission. The machine may be operated autonomously to travel on a path and complete an operation through utilizing the digital site map, the machine's present location, and a selected travel path. The machine controller and/or an off-board system may select travel paths for the machine.

Some machines may have GPS systems which sense the machine's position. However some machines may not be equipped with a GPS system, or GPS receivers may not be able to receive needed signals from satellites because of the terrain of the worksite at some or all times. Some sites have pseudolites or other location identifiers at different positions on the mine sites. However, machines operated autonomously may need to update their locations more frequently than these location identifiers allow.

The disclosed system is directed to overcoming one or more of the problems set forth above.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

A system for mapping terrain using at least a first machine and a second machine traveling along the terrain is disclosed. The system includes a controller for each of the respective first and second machines. Each respective machine includes a plurality of sensors in electrical communication with the controller of each respective machine. The controller is configured to receive, from the plurality of sensors located on each respective machine including a steering sensor, and a ground speed sensing means, and a payload sensor, a plurality of machine parameters indicative of sensed operations of the respective machine as the respective machine travels along the terrain. The plurality of machine parameters include a steering parameter of the respective machine sensed by the steering sensor, a ground speed of the respective machine sensed by the ground speed sensing means, and a payload weight of the respective machine sensed by the payload sensor. The controller is further configured to determine, based on the received machine parameters for the respective machine, a geometry and a grade of a plurality of paths on the terrain along which the respective machine travels. The controller is further configured to create, based on the determined geometry and grade for the respective machine, a site map indicating the plurality of paths for the respective machine. The controller is further configured to determine at least one of an efficiency characteristic and a productivity characteristic for the respective plurality of paths based on the received machine parameters for the respective machine, the at least one of the efficiency characteristic and the productivity characteristic indicating at least one of a fuel efficiency or an amount of payload moved. The controller is further configured to select at least one selected path from the plurality of paths for the respective machine to travel along in a future operation based on the at least one of the efficiency characteristic and the productivity characteristic for the respective plurality of paths for the respective machine. The controller is further configured to operate each of the machines autonomously to travel along at least one of the selected paths for that machine.

A method for mapping terrain using a controller for each of a first machine and a second machine is also disclosed. The method includes receiving, by the controller of each of the first machine and the second machine, a plurality of machine parameters indicative of sensed operations of the first machine and the second machine from a plurality of sensors as the first and second machines travel along the terrain. The plurality of sensors are located on each of the first machine and the second machine, and are in electrical communication with the controller of each of the first machine and a second machine respectively; and include a steering sensor, a ground speed sensing means, and a payload sensor. The plurality of machine parameters include a steering parameter of the first and second machines sensed by the steering sensors, a ground speed of the first and second machines sensed by the ground speed sensing meanss; and a payload weight of the first and second machines sensed by the payload sensors. The method further includes determining, based on the received machine parameters for the respective machines and using the respective controllers, a geometry and a grade of a plurality of paths on the terrain along which the respective machines travel; and creating, using the respective controllers, a map indicating the plurality of paths for the respective machines based on the determined geometry and grade for the respective machines. The method further includes determining, using the respective controllers, at least one of an efficiency characteristic and a productivity characteristic for the respective plurality of paths based on the received machine parameters for the respective machines, the at least one of the efficiency characteristic and the productivity characteristic indicating at least one of a fuel efficiency and an amount of payload moved; and transmitting the at least one of the efficiency characteristic and the productivity characteristic for the respective plurality of paths from the respective controllers to an off-board system. The method further includes selecting, using the off-board system, at least one selected path from the plurality of paths for the respective machines to travel along in a future operation based on the at least one of the efficiency characteristic and the productivity characteristic for the respective plurality of paths for the respective machines, and transmitting the at least one selected path selected for the respective machines from the off-board system to the respective controllers; and operating each of the first machine and the second machine autonomously using the respective controllers to travel along at least one of the selected paths for the respective machines by the off-board system.

A second embodiment of a system for mapping terrain using at least a first machine and a second machine traveling along the terrain is also disclosed. The system includes a controller for each of the respective first and second machines. The controller is configured to receive a plurality of machine parameters relating to an operation of the respective machine as the respective machine travels along the terrain from a plurality of sensors located on each respective machine, the plurality of sensors are in electronic communication with the controller of each respective machine and including a steering sensor, a ground speed sensing means, and a payload sensor. The plurality of machine parameters include a steering parameter of the respective machine sensed by the steering sensor, a ground speed of the respective machine sensed by the ground speed sensing means, and a payload weight of the respective machine sensed by the payload sensor. The operation includes fuel injection in an engine of the respective machine. The controller is further configured to determine, based on the received machine parameters for the respective machine, a geometry and a grade of a plurality of paths on the terrain along which the respective machine travels; and create, based on the determined geometry and grade for the respective machine, a site map indicating the plurality of paths for the respective machine. The controller is further configured to determine, based on the received machine parameters for the respective machine, a characteristic relating to at least one of efficiency or productivity for the respective plurality of paths for the respective machine, the characteristic indicating a fuel efficiency or an amount of payload moved; and select at least one selected path from the plurality of paths for the respective machine to travel along in a future operation based on the characteristic relating to the at least one of efficiency or productivity for the respective plurality of paths. The controller is further configured to operate respective machine autonomously to travel along at least one of the selected paths for the respective machine.

These and other features, aspects and advantages of the present invention will become better understood with reference to the following drawings, description and claims.

BRIEF DESCRIPTION OF THE DRAWINGS

FIG. 2 is a schematic and diagrammatic representation of an exemplary system for mapping terrain.

FIG. 3 is a schematic and diagrammatic representation of a machine and components of the machine, according to an exemplary embodiment.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Figure 1:
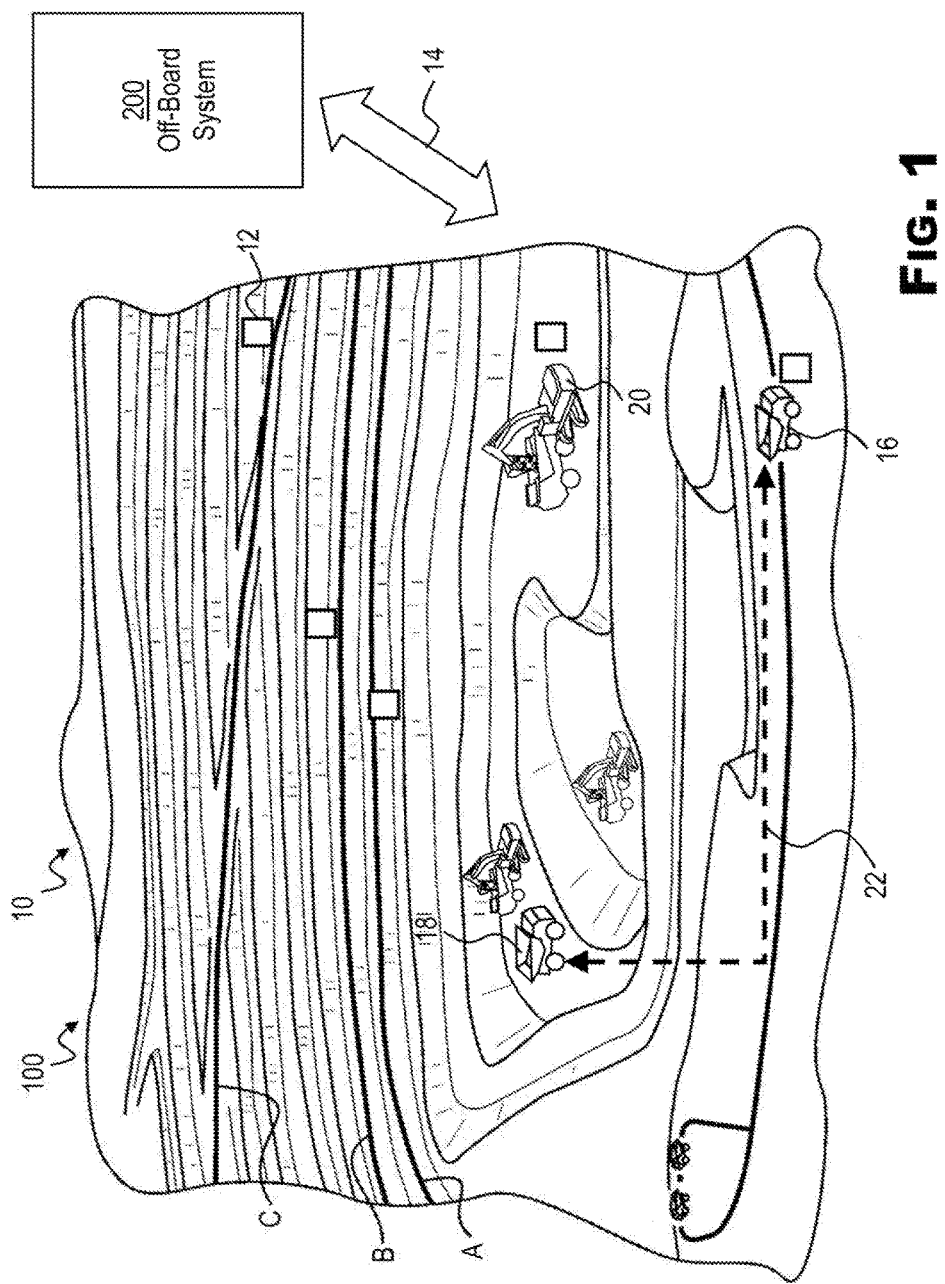
FIG. 1 is a schematic and diagrammatic representation of an exemplary mine layout.

FIG. 1 illustrates a system 100 for mapping terrain using at least a first machine 102 (shown in FIGS. 2 and 3) and a second machine 104 (shown in FIGS. 2 and 3) traveling along the terrain at a work site 10. The worksite may be, for example, an open pit mine operation. The work site 10 may include a single or a plurality of locations where one or more machines 20 operate. For example, the work site 10 may include an open pit mine and one or more processing regions, which may be on top of one or more dumping mounds. The mine may be connected to the processing region by one or more haul routes or paths, such as path A, path B, and path C shown in FIG. 1. A fleet of machines 20, such as hauling machines 18 and/or other types of machines, may travel from an area of excavation of the mine along the paths to the processing region(s). Another machine 20, such as a digging machine 16, may operate to dig and/or excavate material, which may be ore or overburden and which may be loaded into the hauling machine 18. Hauling machines 18 may include hauling trucks which haul payloads in a haul body after being loaded by a digging machine 16. Digging machines 16 may include an excavator, a loader, or other machine configured to dig ore or other material and load it in the hauling machine 18. When performing a digging operation a digging machine 16 may be mated with a hauling machine 18. The mating may be based on best matching the digging capability of the digging machine 16 with the hauling capability of the hauling machine 18.

The hauling machine 18 may carry a payload, e.g., the excavated material, when traveling from the mine to the processing region(s). Thus, in an exemplary haulage cycle, a payload may be loaded onto the hauling machine 18, the hauling machine 18 may travel along its assigned path A, B, or C from the mine to the processing region, where the payload may be unloaded from the hauling machine 18, and then the hauling machine 18 may travel along its assigned path A, B, or C back to the mine from the processing region. Each hauling machine 18 may be assigned to a specific path A, B, or C for a particular day, week, or other period of time, or until a particular haulage operation is completed.

The point of excavation within the mine and the processing region may be at different elevations. As a result, the hauling machine 18 may travel along path A, B, or C at least in part from a lower elevation to a higher elevation (or vice versa), such that the path A, B, or C may have a grade or slope. The geometry and/or grade of the respective paths A, B, C may also change over time. For example, the paths A, B, C may be modified as more material is removed from the mine and/or as different locations for obtaining payload are found. In FIG. 1, paths A, B, and C are shown having different start and end points. It is to be understood, however, that the paths A, B, C may have one or more common start and/or end points. Further, there may be greater than or less than three paths. Further, other paths may be identified, other than paths between points of unloading or loading payload as described below.

Locator devices 12 (shown as small rectangles) may be located at various points along the paths A, B, and C, and at other locations on the worksite. The locator devices 12 may transmit their location via a short range communication link (not shown) to the machines 20 when they are within a certain range. The machines 20 may receive the information and save the position information in a memory component 144 (shown in FIG. 3) of a machine controller 140 (shown in FIG. 3). The controller 140 may use this position information to determine the machine 20 position and map the terrain of the work site 10.

The machines 20 may be operated autonomously (without an operator on board) or semi-autonomously (with some operations performed without input from an operator). To receive information to operate autonomously or semi-autonomously, the machines 20 may be communicatively linked to an off-board system 200 through communication link 14. Communication link 14 may be a satellite link, a cellular link, or other link known in the art. In some embodiments, communication link 14 may include a long range communication link to a secondary communication hub on the work site 10. The communication hub may then transfer information to machines 20 through a short range communication link when machines 20 are in range. Machines 20 may also be communicatively linked to each other through communication link 22 to transfer information between the machines 20. Information to and from the off-board system 200 may be transmitted to one machine 20 and from that machine 20 to other machines 20. In some worksites 10 communication links may sometimes be blocked because of the terrain and various communication links may be used to overcome this difficulty.

The hauling machines 18 may be large, off-road vehicles. It should be noted that the disclosed embodiment may be applicable to other types of machines 20 such as, for example, on-highway trucks or other earthmoving machinery capable of carrying a payload. The disclosed embodiment may also be applicable to a mobile machine that performs any type of operation associated with an industry such as mining, construction, farming, transportation, power generation, tree harvesting, forestry, or any other industry known in the art. For example, the machine 20 may be a truck, a crane, an earthmoving machine, a mining machine, material handling equipment, farming equipment, an excavator, a dozer, a loader, a backhoe, a motor grader, a dump truck, a feller, a harvesting machine, a skidder, a forwarder, or any type of machine that operates in a work environment such as a construction site, mine site, power plant, tree harvesting site, etc.

Referring now to FIG. 2, an exemplary embodiment of the system 100 is illustrated in a schematic and diagrammatic representation. The system 100 may include the off-board system 200, and a plurality of machines 20 communicatively linked through links 14 to the off-board system 200. The plurality of machines 20 may include a first machine 102, a second machine 104, a third machine 106, and a fourth machine 108. The first machine 102, second machine 104, and third machine 106 may be hauling machines 18. The fourth machine 108 may be a digging machine 16. Some machines 20 may be communicatively linked to other machines 20 through links 22.

The off-board system 200 may maintain and continuously update through, for example, communications from the machines 20, a digital site map 210 of the worksite, and send commands to autonomous and semi-autonomous machines 20 on the work site 10 to perform operations at the work site 10. The off-board system 200 may include a computer 202. The computer 202 may include a processor 204, a memory component 206, a transceiver 208, and the digital site map 210. Although the off-board system 200 is illustrated as a single entity with a single computer 202, the off-board system 200 may include multiple centers in multiple physical locations. Each of the one or multiple centers may include one or more computer units which may be networked together, as known in the art, to form the computer 202. The computer 202 may perform additional functions not detailed in this description in addition to the methods described below and illustrated in FIGS. 4A-4J.

The processor 204 may include microprocessors or other processors as known in the art. In some embodiments the processor 204 may include multiple processors. The computer 202 may execute instructions, as described below and in relation to FIGS. 4A-4J, which may update the site map 210, and send commands and information to the machines 20 at the work site 10. Such instructions may be read into or incorporated into a computer readable medium, such as the memory component 206, or provided external to processor 204. The instructions may include multiple lines or divisions of code. The lines or divisions of code may not be in consecutive order, and may not be located in the same section of code. In alternative embodiments, hard-wired circuitry may be used in place of or in combination with software instructions as described above, below, or in relation to the drawings.

The term "computer-readable medium" as used herein refers to any non-transitory medium or combination of media that participates in providing instructions to the processor 204 for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

The memory component 206 may include the digital site map 210. The digital site map 210 may include information on the terrain of the work site 10, the machines 20 located on the work site 10 and their position, information on conditions of the terrain on the worksite, and efficiency and productivity characteristics of machines 20 in relation to locations or paths on the work site 10. The computer 202 may update the digital site map 210 based on information transmitted from machines 20 as well as other sources such as user input. The digital site map 210 may be any database structure known in the art.

Referring now to FIG. 3, an exemplary embodiment of the machine 20 is illustrated in a schematic and diagrammatic representation. The machine 20 may be a hauling machine 18 or a digging machine 16. The machine 20 may include any of the plurality of machines 20 on the work site 10 including, but not limited to, the first machine 102, the second machine 104, the third machine 106, and the fourth machine 108. The machine 20 may include an engine 110 or other power source operable to provide a power output for various operations of the machine 20. The engine 110 may be associated with various electrical and mechanical systems of the machine 20 such as, for example, a transmission 112 for transmitting power from the engine 110 to one or more traction devices (not shown) (e.g., wheels or tracks), a fuel system 114 for providing fuel (e.g., diesel fuel, gasoline, a gaseous fuel such as natural gas, or other types of fuel) to the engine 110, a hydraulic system 116 for controlling one or more hydraulic components in the machine 20, a work tool or haul body 122 and actuators 124 for actuating the work tool or haul body 122, a steering system 118 for steering the machine 20, or any other electrical or mechanical system operable to perform an operation associated with the machine 20.

The machine 20 may also include one or more operator input devices 126 (e.g., located in an operator cab of the machine 20) for operating machines 20 which are not operated autonomously, or to override autonomous operation, configured to receive input from the operator. For example, the operator input devices 126 may include a transmission operator device that produces a transmission input signal in response to an operator transmission command, to allow for operator control of a manual or partially-manual transmission 112. The transmission 112 may include a plurality of gears, and may receive an automatic or operator-controlled gear shift command (e.g., via the operator input device 124) and responsively perform the desired gear shift. The transmission 112 may also be configured to produce a transmission gear signal indicative of a gear selected for current use, which may indicate the gear ratio and direction of travel (e.g., forward, reverse, etc.).

The machine 20 may also include a monitoring system including a plurality of sensors 154 or monitoring devices configured to monitor at least one machine parameter relating to an internal operation of the machine 20. These parameters relate to an internal operation of the machine 20 since the parameters are determined based on sensed parameters and other information relating to operations occurring inside the machine 20, such as fuel injection in the engine 110, a rotation or control of a component in the machine 20, etc. For example, the sensors 154 may include a steering sensor 128, a ground speed sensing means 130, an engine speed sensor 132, a payload sensor 134, a grade sensor (or inclinometer) 136, and a drive train load sensor 138. These sensors 154 may be in electrical communication with, and may be configured to send sensor signals indicative of the sensed parameters to the machine controller 140. The machine controller 140 may be a processor-based controller or computer system adapted to perform various communication, analytical, and/or control functions associated with the machine 20. For example, the machine controller 140 may be configured to receive data from a plurality of components and subsystems of the machine 20 (e.g., the engine 110, the transmission 112, the fuel system 114, the hydraulic system 116, the operator input device 126, the sensors 154, etc.). The machine controller 140 may analyze the received data and determine, based on the analysis, an appropriate response to the received data as described below. The machine controller 140 may also control the machine 20 autonomously, or control certain functions of the machine 20 autonomously. The machine controller 140 may receive commands and/or information from other machine controllers or the off-board system 200 on which the machine controller 140 may base, at least in part, the control of autonomous functions of the machine 20 and/or machine components.

The steering sensor 128 may be located near or connected to a steering device of the steering system 118, such as steering cylinders, or other steering system 118 parts which may indicate a steering angle. The steering sensor 118 may be configured to generate a signal indicative of the steering angle of the machine 20 or other parameter relating to steering.

The ground speed sensing means 130 may be configured to sense a speed of the machine 20 relative to a surface of the terrain and generate a signal indicative of the sensed ground speed. For example, the ground speed sensing means 130 may use doppler shift from a GPS receiver to determine the ground speed. In another embodiment, the ground speed may be determined by calculating the derivative of a sequence of positions provided by an external references such as a GPS or Laser tracking system. In another embodiment, the ground speed may be determined by sensing a speed associated with the output of the transmission 112, and the machine controller 140 may calculate the ground speed based on the sensed speed, a dimension of the traction device of the machine 20 (e.g., the radius of the wheels), and a gear ratio indicated from the transmission gear signal received from the operator input device 126, or a gear signal from the transmission 112. In other embodiments an optical or other sensor may be used.

The engine speed sensor 132 may be operably associated with the engine 110 and may be configured to detect the engine speed. For example, the engine speed sensor 110 may be configured to measure a rotational speed (e.g., revolutions per minute) of an output shaft, crankshaft, flywheel, or camshaft of the engine 110. In another exemplary embodiment, the engine speed sensor 110 may be configured to measure a shaft speed within the transmission 112 or a speed of another component connected to the engine 110. The engine speed sensor 110 may be configured to generate a signal indicative of the sensed engine speed.

The payload sensor 134 may be configured to detect a weight of the payload carried by the machine 20. In an exemplary embodiment, the payload sensor 134 may include one or more sensors, such as a torque sensor, a weight sensor, a pressure sensor, and/or other sensors configured to monitor the payload weight, as known in the art. In another exemplary embodiment, the payload sensor 134 may indirectly monitor the payload by monitoring the pressure of struts in a suspension system (not shown), the pressure of cylinders in a truck bed hoist system (not shown), or the pressure of lift cylinders in a loader linkage (not shown), as known in the art. Other known systems may also be used. The payload sensor 134 may be configured to generate a signal indicative of the sensed payload weight.

The machine 20 may include the grade sensor 136, which may be configured to detect an inclination of the machine 20. In one exemplary embodiment, the grade sensor 136 may be associated with or fixedly connected to a frame or other stable surface of the machine 20. Alternatively, the operator may carry a mobile or other handheld device including the grade sensor 136 configured to detect the inclination of the machine 20 and transmit inclination data to the machine controller 140 wirelessly or via wired connection. The grade sensor 136 may be configured to detect grade or incline in any direction, including a forward-rear direction and/or a left-right direction. The grade sensor 136 may be configured to generate a signal indicative of the sensed grade. The grade sensor 136, however, may be omitted in some embodiments, and the grade may be determined based only on other machine parameters as described below.

The machine 20 may include the load sensor 138, which may be configured to detect the load on the drive train of the machine 20. In one exemplary embodiment, the load sensor may be a torque sensor fixed to a portion of the drive train. In other embodiment, the load sensor may be a virtual sensor, with the machine controller 140 determining the load based on other parameters such as fuel rate and engine speed.

The sensors 154 described above may be physical (hardware) sensors that directly sense or measure the sensed parameter. Alternatively, the sensors 154 may also include virtual sensors that generate the signal indicative of the sensed parameter, e.g., based on a map-driven estimate.

The machine controller 140 may also be configured to calculate other machine parameters, e.g., other machine parameters relating to an internal operation of the machine 20, such as a fuel rate, an acceleration (or deceleration) of the machine 20, a parameter indicating a parasitic load or loss associated with a drive train of the machine 20, the transmission gear ratio and direction of travel, etc. For example, the machine controller 140 may calculate the fuel rate based on fuel injection timing and pressure, which may be sensed parameters or values stored in a memory component 144. The machine controller 140 may also calculate the acceleration (or deceleration) of the machine 20 based on the derivative of the sensed ground speed with respect to time (e.g., based on the ground speed sensing means 130). The machine controller 140 may calculate the parameter indicating a parasitic load associated with a drive train of the machine 20, e.g., based on the sensed engine speed. The parameter may be a percentage value indicating, e.g., a percentage of the gross power output from the engine 110 that is actually transferred to the traction device. For example, the parasitic load may be associated with one or more components of the engine 110 and/or the transmission 112, and/or one or more components connecting the engine 110 and/or the transmission 112 to the traction device, such as a torque converter, differential, axle, gear, etc. The machine controller 140 may also calculate the transmission gear ratio and direction of travel based on signals (e.g., received by sensors) indicative of input and output speeds of the transmission 112.

In the exemplary embodiment, one machine controller 140 is provided, but it is understood that the machine controller 140 may include multiple controllers so that different components and subsystems may be provided with separate controllers. For example, a plurality of controllers may be used to control and/or receive data from different systems of the machine 20 and also to coordinate operations of these systems. In an embodiment, the engine 110, the transmission 112, a payload monitoring system associated with the payload sensor 134, and/or the hydraulic system 116 may be provided with separate controllers. The plurality of controllers may be coupled together via a communication network to exchange data simultaneously.

The machine controller 140 may include one or more processors 142, the memory component 144, a transceiver device 146, a digital site map 148, a machine information database 150, and an autonomous operation module 152. The processor 142 may be configured to receive signals from the operator input devices 126, the sensors 154, the off-board system 200, and other machines 20 and process information stored in the memory component 144. The processor 142 may also generate messages to transmit to the off-board system 200, and/or other machines 20. The processor 142 may be configured with different types of hardware and/or software (e.g., a microprocessor, a gateway, a product link device, a communication adapter, etc.). The processor 42 may also provide interface functions for transmitting data and commands to, and receiving data from machine 20 systems and components such as, but not limited to, the work tool or haul body actuators 122, the steering system 118, the hydraulic system 116, the fuel system 114, the transmission 114, and the engine 110. Further, the processor 142 may execute software for performing one or more functions consistent with the disclosed embodiments, and for executing methods described in relation to FIGS. 4A-4J. The processor 142 may include any appropriate type of general purpose microprocessor, digital signal processor, or microcontroller.

The memory component 144 may be configured to store processes and/or data, including computer programs and computer code, that may be used to process the signals from and send commands to the sensors 154, and machine 20 systems and components such as, but not limited to, the work tool or haul body actuators 122, the steering system 118, the hydraulic system 116, the fuel system 114, the transmission 114, and the engine 110. The memory component 144 may be configured to store information used by the processor 142 and data received from the sensors 154, and machine 20 systems and components such as, but not limited to, the work tool or haul body actuators 122, the steering system actuators 120, the hydraulic system 116, the fuel system 114, the transmission 114, and the engine 110. The memory component 144 may be configured to store information transmitted to or from the machine controller 140 to or from the off-board system 200 and/or other machines 20. The memory 44 may also be configured to store one or more machine parameters, such as the sensed and/or calculated machine parameters, a mass or weight of the unloaded machine 20 (e.g., without payload, including an estimated weight of the operator, etc.), the maps described below, etc. Moreover, the memory 44 may store information and/or computer programs used by the processor 142 to enable the processor 142 to perform functions consistent with disclosed embodiments, e.g., the methods described in relation to FIGS. 4A-4J discussed in detail below. The memory component 144 may include one or more memory devices including, but not limited to, a storage medium such as read-only memory (ROM), a flash memory, a dynamic or static random access memory (RAM), a hard disk device, an optical disk device, etc.

The transceiver device 146 may include one or more devices that transmit and receive data, such as data processed by the processor 142 and/or stored by the memory component 144. The transceiver device 146 may transmit the data to or receive data from the off-board system 200 and/or other machines 20.

The digital site map 148 may be similar to the digital site map 210 of the off-board system 200 and may contain some, all, and/or additional information. All of the machines 20 on the work site 10 and the off-board system 200 may send information to each other to continuously update the digital site maps 148, 210. The digital site map 148 may be any database structure known in the art and may be contained within the memory component 144.

The machine information database 150 may contain information on the machine such as engine type and make and horse power, transmission type and gear ratios, machine weight, haul body weight, tire size, axle ratios, machine and component dimensions, and any other machine information which may be used to implement the methods and processes described herein. The machine information database 150 may be any database structure known in the art and may be contained within the memory component 144.

The autonomous operation module 152 may include encoded instructions contained within the memory component 144. The autonomous operation module 152 includes multiple lines or divisions of code. The lines or divisions of code may not be consecutive order, and may not be located in the same section of code. The code when executed by the processor 142 may operate the machine 20 or parts or components of the machine 20 autonomously, according to instructions in the autonomous operation module 152 or commands from the off-board system 200. The machine controller 16 may be communicatively linked to machine components and system, such as the work tool or haul body actuators 122, the steering system actuators 120, the hydraulic system 116, the fuel system 114, the transmission 114, and the engine 110 to send commands to implement autonomous operations.

Optionally, the machine 20 may also include a GPS device (not shown) that generates location data, e.g., GPS coordinates and elevation data, for the machine 20 based on data from a satellite, local tracking system, or any other position sensing system known in the art. The location data may be collected by the processor 142 and/or stored in the memory 144. The GPS device, however, may be omitted such that the location and trajectory of the machine 20 is determined based only on the machine parameters as will be described in detail below.

INDUSTRIAL APPLICATION

On work sites 10 with machines 20 traveling on paths or roads to move material from digging sites to dumping sites, it may be advantageous to map the terrain and use the mapping to perform operations in an efficient and productive manner at the work site 10. Some machines 20 may not include a GPS system, or signals from GPS satellites may be blocked by the terrain of the work site 10. Machine parameters may be utilized to map the terrain of the work site with autonomous machines without the use of GPS.

Figure 4A:
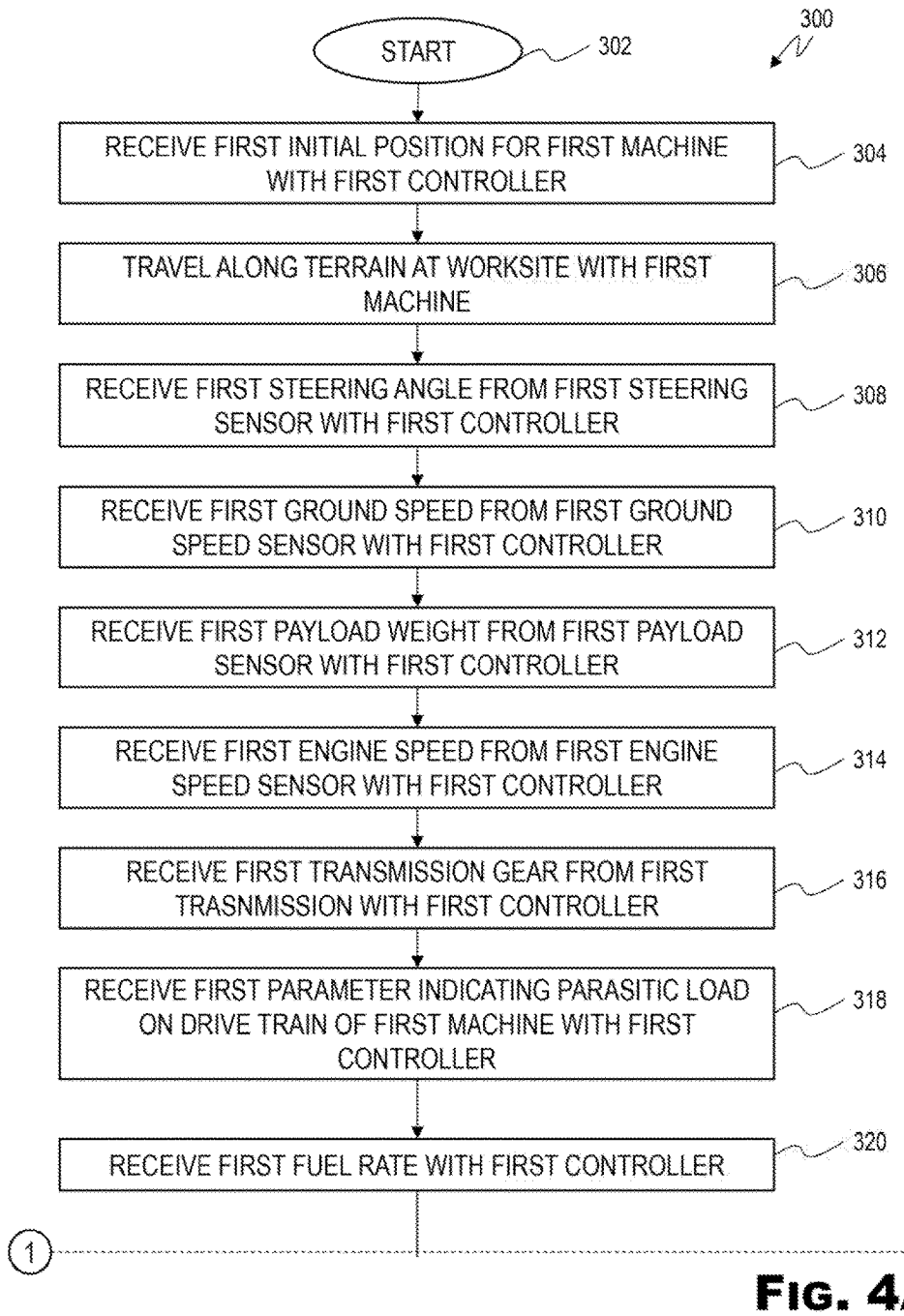
FIG. 4A is a flow chart of a first portion of an exemplary method for mapping terrain and operating autonomous machines.

Referring now to FIG. 4A, a first portion of an exemplary method 300 for mapping terrain and operating autonomous machines is illustrated in a flow chart. The method 300 begins at step 302. The transceiver device 146 of the first machine 102 may receive a position signal from one of the locator devices 12 and the machine controller 140 may store the position in the memory component 144 (step 304). The first machine 102 may travel along terrain at the work site 10. For example, the first machine 102 may travel on the paths A, B, and/or C (step 306). While the first machine 102 is traveling on the work site 10, the machine controller 140 may receive signals and/or calculate various parameters of the first machine 102 from the sensors 154, machine components and systems, and/or the memory component 144 with the machine controller 140. For example, the machine controller 140 may receive a steering angle from the steering sensor 128 (step 308), a ground speed from the ground speed sensing means 130 (step 310), a payload weight from the payload sensor 134 (step 312), an engine speed from the engine speed sensor 132 (step 314), a transmission gear from the transmission 112 (step 316), a load signal from the load sensor 138 (step 318), and a fuel rate from the fuel system 114 (step 320). The method 300 moves to steps in FIG. 4B.

Figure 4B:
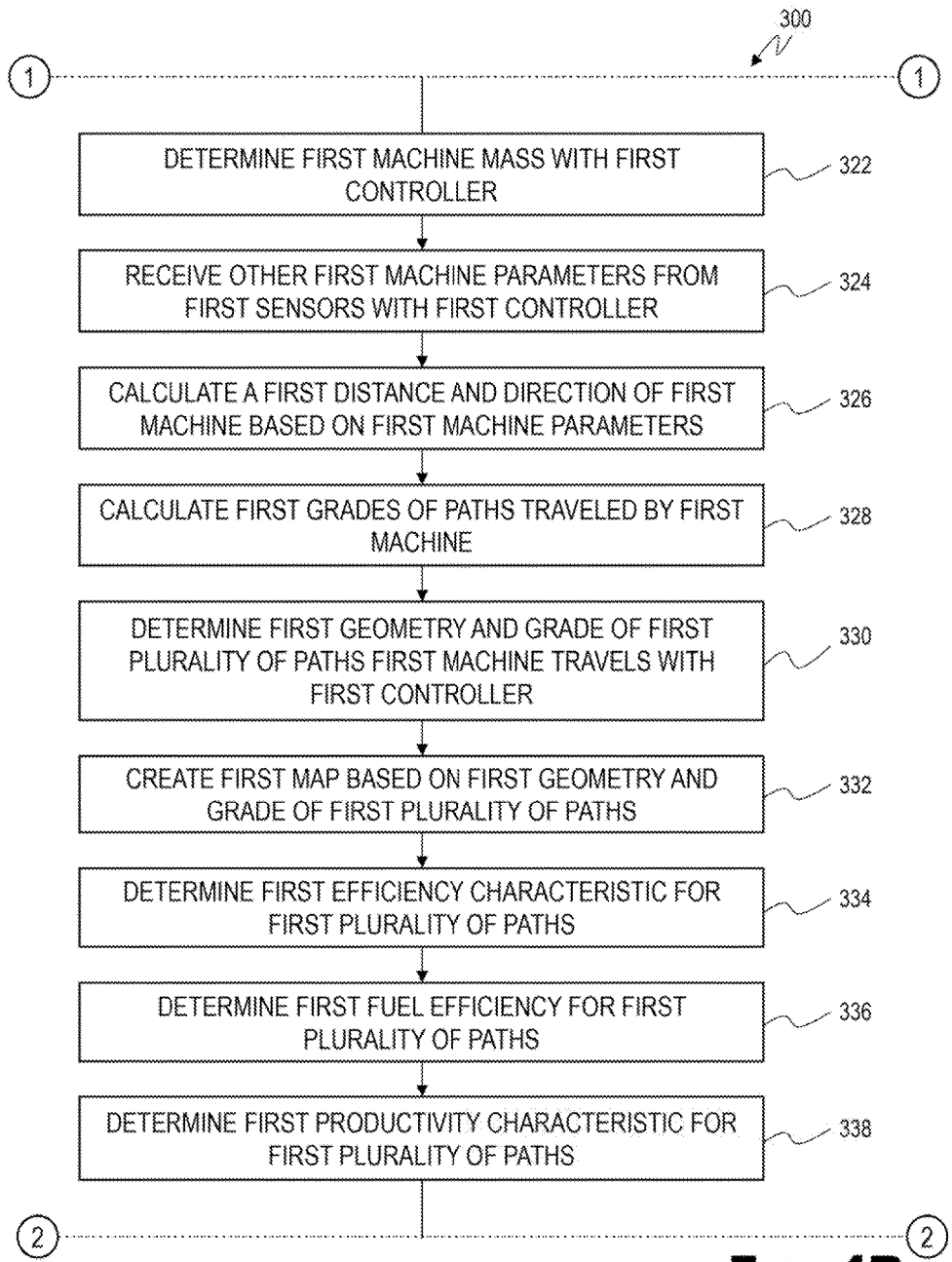
FIG. 4B is a flow chart of a second portion of the exemplary method for mapping terrain and operating autonomous machines.

Referring now to FIG. 4B is a flow chart of a second portion of the exemplary method for mapping terrain and operating autonomous machines. The machine controller 140 may also receive a machine mass from the machine information database 150 (step 322), and other parameters from other sensors, components, and systems (step 324).

These machine parameters may be monitored periodically (e.g., at predetermined time intervals) and/or continuously. The machine controller 140 may use the determined machine parameters to monitor a trajectory of the first machine 102, e.g., the geographic coordinates (latitude and longitude and elevation) of the first machine 102 (step 326). For example, the machine controller 140 may determine the trajectory of the first machine 102 based on the steering parameter, the ground speed, and/or the acceleration of the first machine 102, as determined in step 100. The steering parameter may be used to determine the direction in which the first machine 102 is traveling, and the ground speed and/or acceleration may be used to determine the distance along which the first machine 102 travels. Other machine parameters may also be used.

The trajectory may be determined as follows. The machine controller 140 may determine when the first machine 102 starts and stops, such as when the engine 110 is started and stopped, to indicate the start and end points of the trajectory and to initiate when to start recording data. The machine controller 140 may also use other actions to determine start and end points, such as when the first machine 102 loads or unloads material, or performs other operations.

When the machine controller 140 records a start point, the machine controller 140 may also determine the location of the first machine 102. The location of the first machine 102 may be determined, e.g., by input from the operator via one of the operator input devices 126 (e.g., the operator may carry a mobile GPS device configured to transmit location data to the machine controller 140 wirelessly or via wired connection, the operator may input geographic coordinates of the start point, etc.), using the GPS device if available on the first machine 102, by input from the locating device 12 at the work site 10, etc. For example, the first machine 102 may be configured to receive a signal from the locating device 12 at the work site 10 when the first machine 102 passes within close proximity to the locating device 12. The signal from the locating device 12 may indicate the location of the locating device 12 (and therefore of the first machine 102). For example, the transceiver device 146 may include a radio-frequency identification (RFID) reader and the locating device 12 may include an RFID tag with information including the location data. The locating device 12 may be located, for example, at an opening gate or a base station for the work site 10 so that when the first machine 102 passes through the gate or near the base station, the machine controller 140 may determine that the location is a start point. Then, the machine controller 140 begins monitoring the machine parameters, as described above in connection with steps 308-324, until reaching the end point, e.g., when the engine 110 is shut down or when another operation indicating the end point is performed, e.g., loading or unloading material.

The first machine 102 monitors the trajectory in relation to the location of the start point. For example, after passing the start point, the machine controller 140 may determine a distance traveled (e.g., based on ground speed, acceleration, time, etc.) and the direction traveled (e.g., based on the steering parameter, etc.) in order to determine the geometry of the trajectory.

The machine controller 140 may also use the determined machine parameters to monitor a grade of the terrain on which the first machine 102 travels (step 328). For example, the machine controller 140 may determine the grade based on the mass of the unloaded first machine 102, the payload weight, the engine speed, the transmission gear, the ground speed, and/or the parameter indicating the parasitic load of the first machine 102, as determined in steps 308-324. The engine speed, the transmission gear, and the parameter indicating the parasitic load may be used to determine a power output from the engine 110, and the mass of the unloaded first machine 102 and the payload weight may be used to determine the total weight of the first machine 102. The power output, the total weight of the first machine 102, and the ground speed may be used to determine the grade of the terrain along which the first machine 102 travels. Other machine parameters may also be used. Alternatively, instead of calculating the grade using the determined machine parameters described above, the machine controller 140 may determine the grade using data provided by the grade sensor 136 if available.

The machine controller 140 may use the monitored trajectory of the first machine 102 and grade to record the path along which the first machine 102 travels and other information such as a corresponding payload weight and fuel rate along the path (step 330). The machine controller 140 may create a map of the path that shows the geometry and grade of the path (step 332), or alternatively update an already existing digital site map 148. The term "geometry" is used herein to refer to at least one of the following: a shape, configuration, or form in two or three dimensions, which may be described using coordinates, or using distances and angles between points or segments (e.g., with respect to a starting point), etc. The recorded path for one period of time or for one operation or task may be, for example, path A, B, or C shown in FIG. 1. The path may be three-dimensional (e.g., including longitude, latitude, and elevation). The first machine 102 may travel along the same paths multiple times per day.

The start and end points of the path may be determined as described above in step 200. Between the start and end points, the first machine 102 monitors the trajectory and grade as described above in connection with steps 326 and 328. Based on the monitored trajectory and grade, the machine controller 140 may create a site map, or update the digital site map 148, including each three-dimensional path (including a geometry and grade) along which the first machine 102 travels, such as paths A, B, C shown in FIG. 1. The site map may include paths recorded at various times in a day and/or on multiple days. The site map may also identify (e.g., next to the respective path on the site map, or in a table or chart) the payload weight carried by the first machine 102 (e.g., sensed by the payload sensor 134) and the fuel rate of the first machine 102 (e.g., determined by the machine controller 140 based on fuel injection timing and pressure, as described above) when the first machine 102 traveled along the respective paths. Also, the time elapsed (e.g., the difference between the start and end times), the start time, the end time, and/or an average grade for the respective paths may also be identified.

Based on the site map recorded in step 332, the machine controller 140 may evaluate efficiency and/or productivity of the first machine 102 for one or more paths (steps 334 and 338). The efficiency and productivity of the first machine 102 may be determined in various ways. For example, the efficiency may indicate a fuel efficiency determined based on the amount of fuel used to travel the particular path divided by the time elapsed to travel the particular path (e.g., the fuel burn rate), or based on the amount of payload moved along the particular path divided by the amount of fuel used to travel the particular path (step 336). The method 300 continues to steps in FIG. 4C.

Figure 4C:
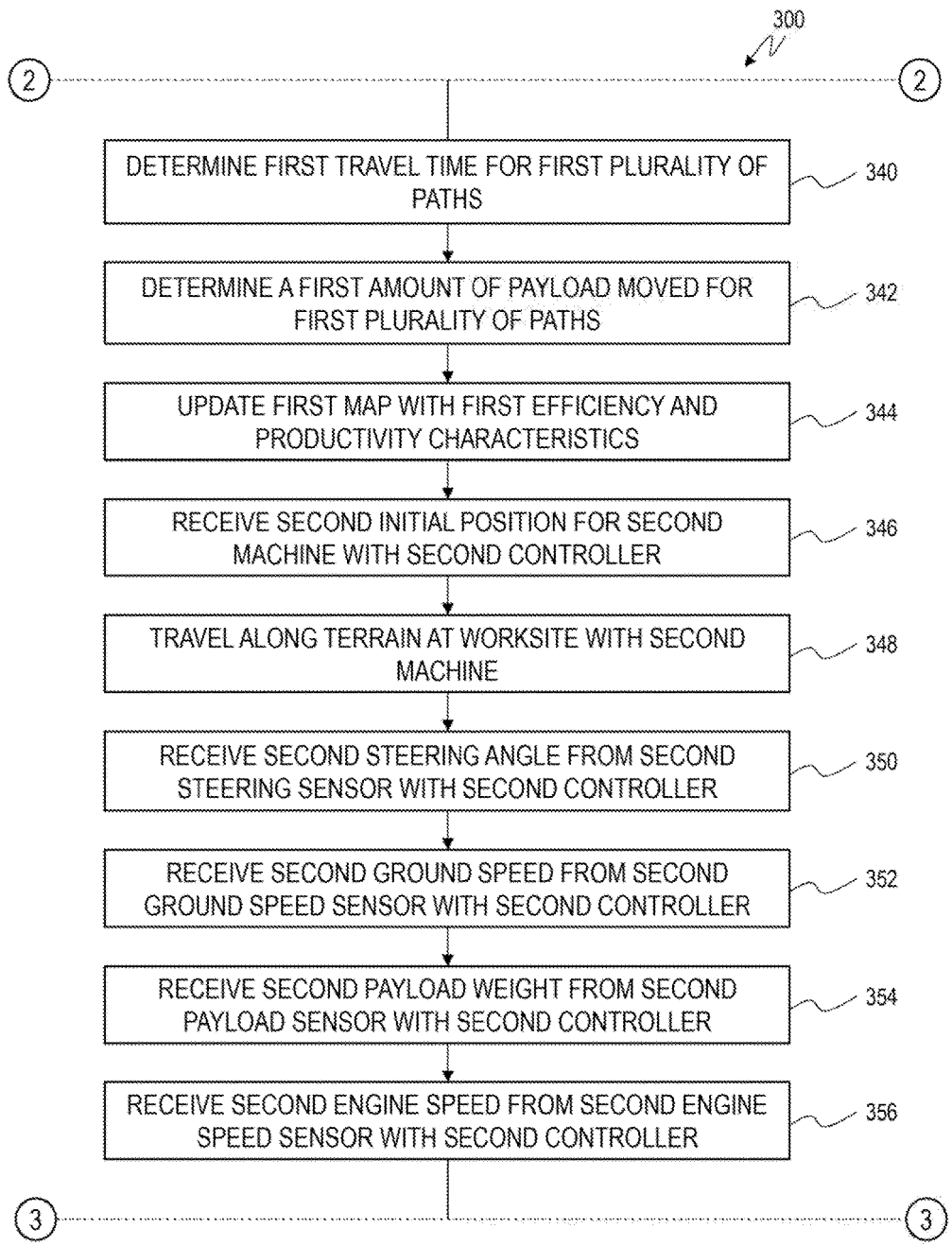
FIG. 4C is a flow chart of a third portion of the exemplary method for mapping terrain and operating autonomous machines.

Referring now to FIG. 4C a third portion of the exemplary method for mapping terrain and operating autonomous machines is illustrated in a flow chart. The productivity may be determined based on the amount of payload moved along the particular path divided by the time elapsed to travel the particular path (e.g., the rate of material moved) (steps 340-342). Other characteristics relating to efficiency and/or productivity known in the art may be determined.

Based on the site map created in step 332 and the efficiencies and/or productivities evaluated in steps 334-342, the machine controller 140 may create or update the digital site map 148 with efficiency and productivity characteristics associated with the paths the first machine 102 followed (step 344). If the first machine 102 is being operated by an operator, a site efficiency map for the first machine 102 may be displayed. If the first machine 102 is being operated autonomously, the updated digital site map 148 may be used to choose a path for a future operation.

Figure 4D:
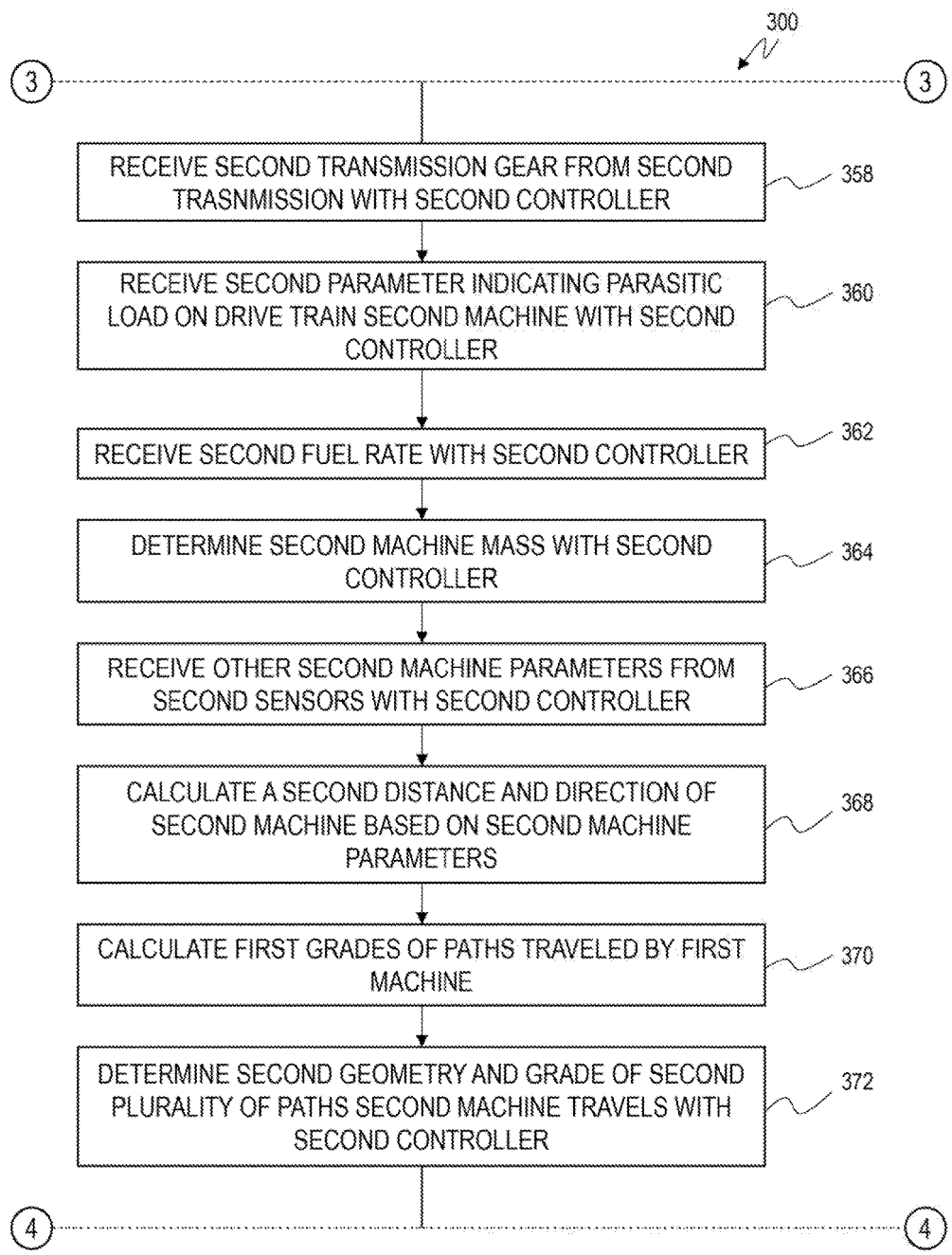
FIG. 4D is a flow chart of a fourth portion of the exemplary method for mapping terrain and operating autonomous machines.
Figure 4E:
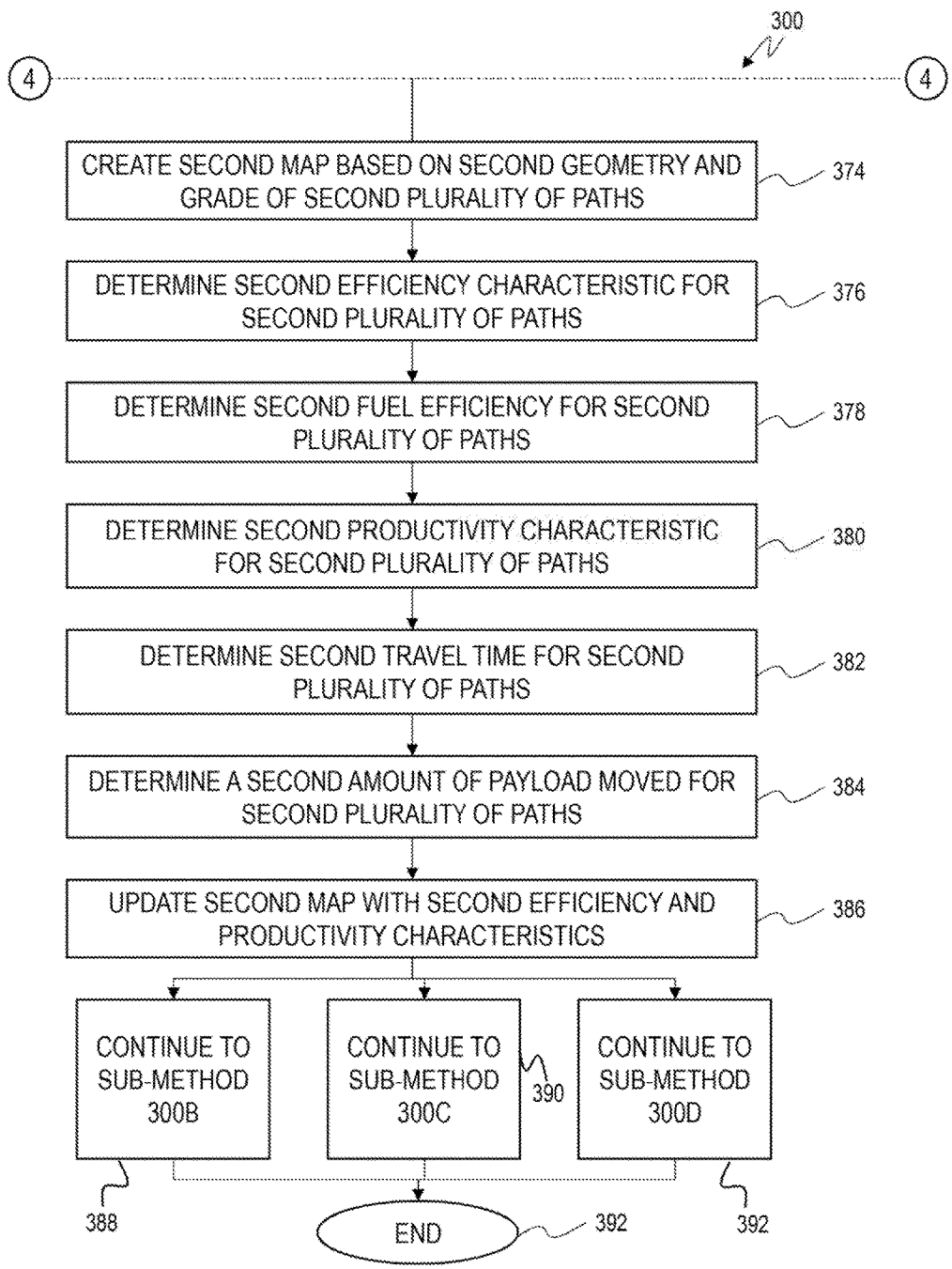
FIG. 4E is a flow chart of a fifth portion of the exemplary method for mapping terrain and operating autonomous machines.

Steps 346-386 illustrated in FIGS. 4C-4E are similar to steps 304-344 in FIGS. 4A-4C except they are performed by or in relation to the second machine 104. As they are similar, they will not be further described. Referring now to steps 388-392 in FIG. 4E, the method 300 moves from step 386 to sub methods 300B, 300C, and/or 300D, and then ends.

Figure 4F:
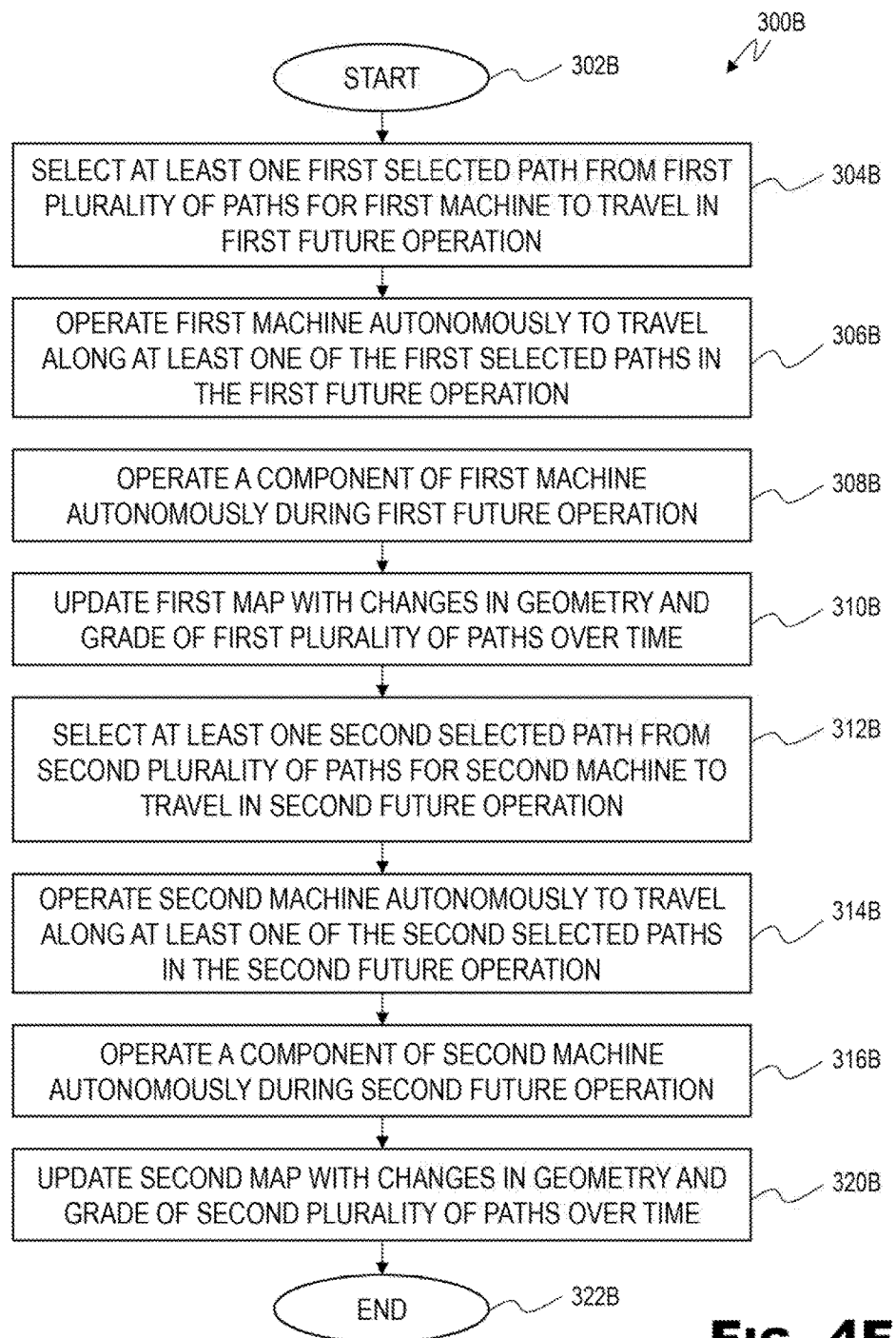
FIG. 4F is a flow chart of a first exemplary sub-method of the method for mapping terrain and operating autonomous machines of FIGS. 4A-4E.

Referring now to FIG. 4F a first exemplary sub-method 300B of the method 300 for mapping terrain and operating autonomous machines of FIGS. 4A-4E is illustrated in a flow chart. The sub method 300B starts at 302B.

The digital site map 148 of the first machine 102 may be updated to identify the values for efficiency and/or productivity of the first machine 102 for one or more paths (e.g., next to the respective path on the site map, or in a table or chart) in order to create the site efficiency map. In an embodiment, instead of recording individual efficiency and/or productivity values for each time the first machine 102 traveled a particular path, the machine controller 140 may group together values relating to the same or similar paths, and may record (e.g., identify with the respective path on the site map) average values for efficiency and/or productivity. As a result, the autonomous operation module 152 or the operator may be able to evaluate the efficiency and/or productivity of the first machine 102 along different paths.

Also, based on the digital site map 148 and the efficiencies and/or productivities, the machine controller 140 may identify and record a change in the values for efficiency and/or productivity of the first machine 102, and/or a change in the trajectory or average grade for one or more paths over a period of time. The period of time may be a predetermined number of days, months, or years, and may be selectable.

When the digital site map 148 contains information recorded over periods of time may allow analysis (digital or human) of how the values for efficiency and/or productivity have changed as the trajectory and/or grade changed over the period of time. As a result, the efficiency and/or productivity of the first machine 102 along different paths as the trajectories and/or grades of the paths change over a period of time may be evaluated.

Based on the efficiency and productivity characteristics and evaluation, one or more paths may be selected to assign the first machine 102 for a future operation (step 304B). In an embodiment, the path may be selected based on which path has better efficiency and/or productivity values for the first machine 102. The selected path may also be displayed to the operator. The autonomous operation module 152 may operate the first machine 102 to travel along a selected path in a future operation (step 306B). The future operation may also include operating a component of the first machine 102 autonomously (step 308B). The first machine 102 may continue to update the digital site map 148 with the geometry and grade of paths the first machine 102 travels continuously over time (step 310B). Steps 312B-320B are similar to steps 304B-310B except they are performed by or in relation to the second machine 104. As they are similar, they will not be further described.

Figure 4G:
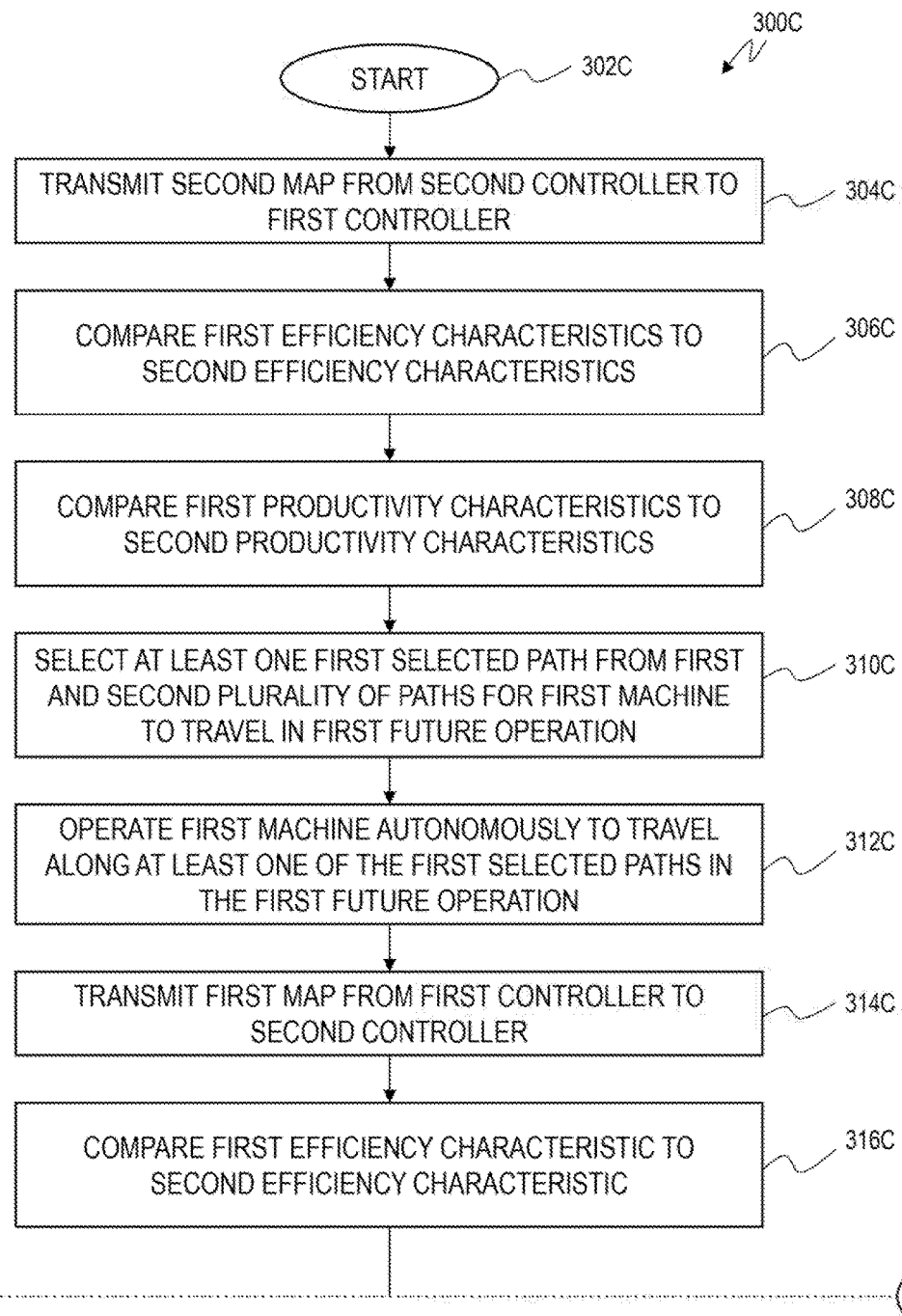
FIG. 4G is a flow chart of a first portion of an exemplary second sub-method of the method for mapping terrain and operating autonomous machines of FIGS. 4A-4E.

Referring now to FIG. 4G a first portion of an exemplary second sub-method of the method for mapping terrain and operating autonomous machines of FIGS. 4A-4E is illustrated in a flow chart. The sub method 300C starts at 302C. The second machine 104 may transmit, and the first machine 102 may receive periodic or continuous updates to the digital site map 148 based on the paths which the second machine 104 travels on the work site. The digital site map 148 updates may include the geometry, grade, efficiency characteristics, and productivity characteristics (step 304C). The machine controller 140 may compare the efficiency and productivity characteristics from the first machine 102 with the efficiency and productivity characteristics from the second machine 104 (steps 306C and 308C).

Figure 4H:
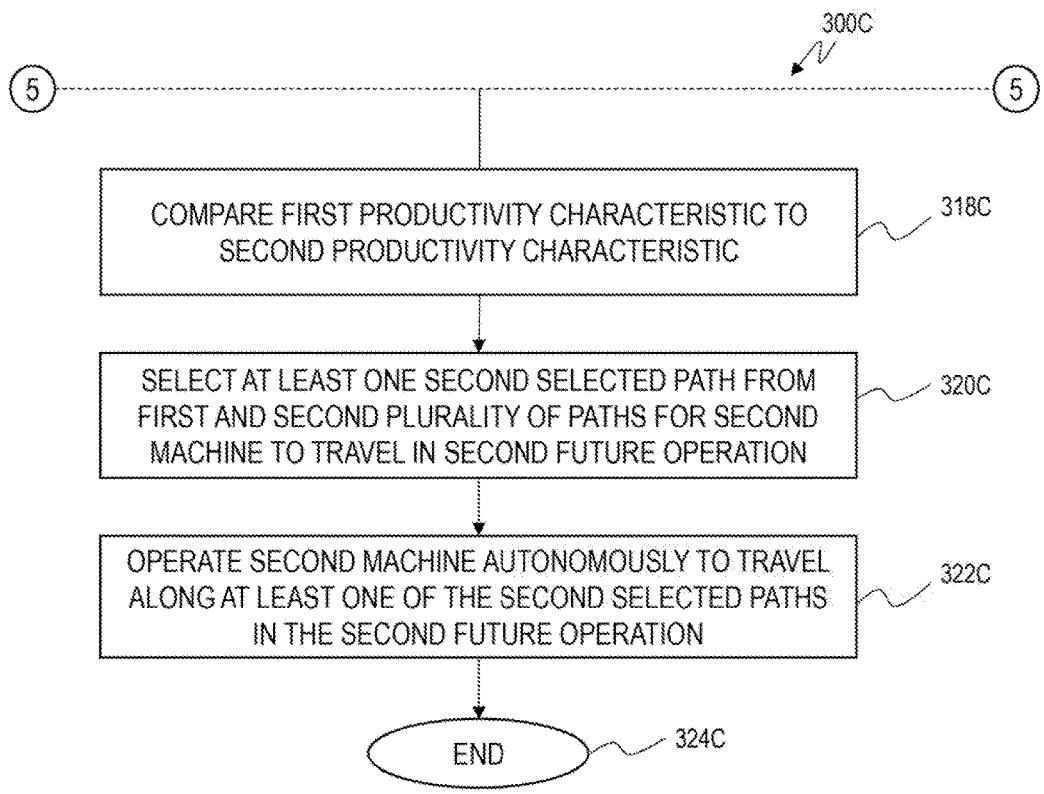
FIG. 4H is a flow chart of a second portion of the second exemplary sub-method of the method for mapping terrain and operating autonomous machines of FIGS. 4A-4E.

The machine controller 140 may select paths for the first machine 102 to travel in a future operation based on the comparison of the efficiency and productivity characteristics from the first machine 102 with the efficiency and productivity characteristics from the second machine 104 (step 310C). The autonomous operation module 152 may then operate the first machine 102 autonomously on a selected path in a future operation (step 312C). Steps 314C-322C in FIGS. 4G and 4H are similar to steps 304C-312C except they are performed by or in relation to the second machine 104. As they are similar, they will not be further described. The sub-method 300C ends at 324C.

Figure 4I:
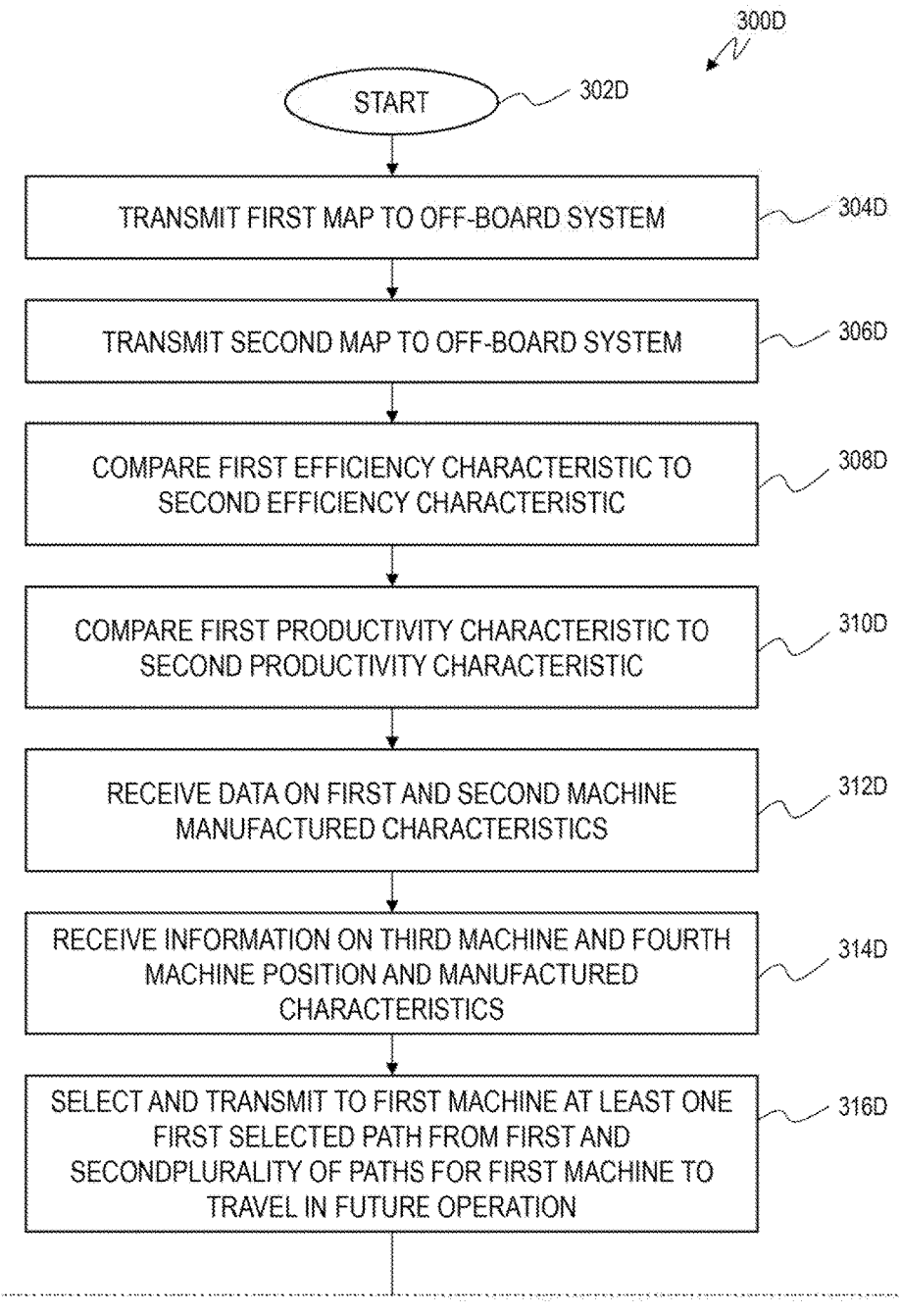
FIG. 4I is a flow chart of a first portion of an exemplary third sub-method of the method for mapping terrain and operating autonomous machines of FIGS. 4A-4E.

Referring now to FIG. 4I, a first portion of an exemplary third sub-method 300D of the method 300 for mapping terrain and operating autonomous machines of FIGS. 4A-4E is illustrated in a flow chart. The sub-method 300D starts at 302D. The first machine 102 and second machine 104 may transmit updates to the digital site map 148 periodically or continuously to the off-board system 200 (steps 304D-306D). The transmission may also include information from the machine information database 150 or an identifier for the machine 20 (step 312D). The off-board system 200 may compare efficiency characteristics and productivity characteristics of the first machine 102 and the second machine 104 (steps 308D-310D), and may take machine information (such as weight, horse power, etc.) into account in the comparison. In some embodiments, digital site map 148 updates from other machines 20, such as the third machine 106 and the fourth machine 108 may be received by the off-board system 200. Efficiency and productivity characteristics from these machines 20 may also be compared with the efficiency and productivity characteristics of the first and second machines 102, 104.

The off-board system 200 may also receive and/or store position and payload information on all the machines 20 at the work site (step 314D). The off-board system 200 may evaluate paths for autonomously operating machines 20 based on a number of factors. The comparison of efficiency and productivity characteristics may be one of those factors. Other factors the off-board system 200 may evaluate is the difference in payload of machines 20. For example, if from the efficiency and productivity characteristic evaluation, paths for two machines 20 are chosen which would simultaneously cross, or put the machines 20 too close together, the off-board system may give priority to the machine 20 with the largest payload the priority. The off-board system may choose another path for the machine 20 with the lower payload.

The off-board system 200 may also evaluate whether a digging machine 16 has a mated hauling machine 18 in place, or is waiting, or may be waiting before restarting a digging operation. The off-board system 200 may prioritize paths for hauling machines 18 to ensure a faster traverse back to a digging site. This may increase productivity by ensuring digging machines 16 are not idle because they are waiting for a mated hauling machine 18. The off-board system 200 may evaluate all these factors and select and transmit to the first machine 102 at least one selected path (step 316D).

Figure 4J:
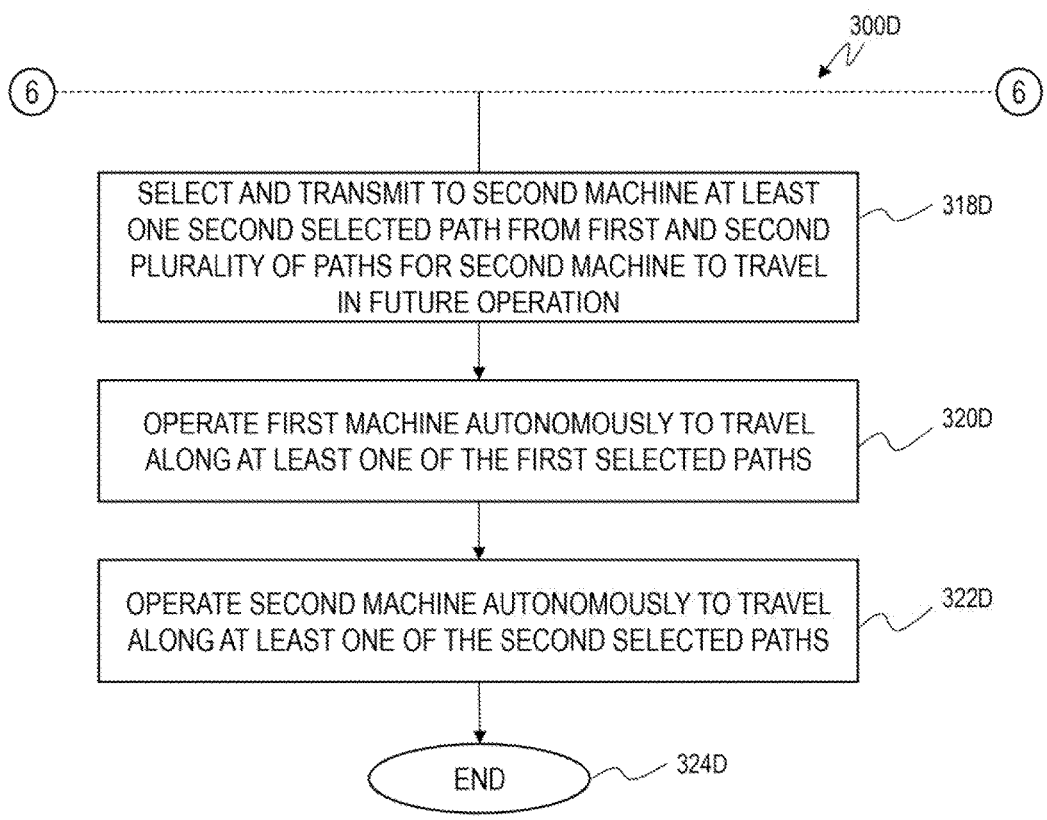
FIG. 4J is a flow chart of a second portion of the third exemplary sub-method of the method for mapping terrain and operating autonomous machines of FIGS. 4A-4E.

Referring now to FIG. 4J a second portion of the third exemplary sub-method 300D of the method 300 for mapping terrain and operating autonomous machines of FIGS. 4A-4E is illustrated in a flow chart. The off-board system 200 may evaluate all these factors and also select and transmit to the second machine 104 at least one selected path (step 318D). Based on the selected paths from the off-board system 200, the machine controller 140 on the first machine 102 and the second machine 104 may operate the respective machines 102, 104 autonomously to travel along at least one of the selected paths (steps 320D-322D). The sub-method 300D ends at 324D.

It should be understood, of course, that the foregoing relates to exemplary embodiments of the invention and that modifications may be made without departing from the spirit and scope of the invention as set forth in the following claims.

We claim:

1. A first machine comprising:
   a controller; and
   a plurality of sensors in communication with the controller, the controller being to:
      receive, from the plurality of sensors, a plurality of machine parameters indicative of sensed operations of the first machine as the first machine travels along a terrain, the plurality of machine parameters including information associated with one or more of:
a steering parameter of the first machine,
a ground speed of the first machine, or
a payload weight of the first machine;
determine, based on the plurality of machine parameters, a geometry and a grade of a plurality of paths on the terrain along which the first machine travels;
create, based on the geometry and the grade, a site map indicating the plurality of paths;
determine at least one of an efficiency characteristic or a productivity characteristic of the first machine based on the plurality of machine parameters,
the at least one of the efficiency characteristic or the productivity characteristic of the first machine indicating at least one of a fuel efficiency or an amount of payload moved;
receive an update to the site map based on one or more paths on which a second machine travels;
compare the at least one of the efficiency characteristic or the productivity characteristic of the first machine with at least one of another efficiency characteristic or another productivity characteristic of the second machine;
select at least one path, from the plurality of paths, for the first machine to travel along in a future operation based on the update to the site map and based on comparing the at least one of the efficiency characteristic or the productivity characteristic of the first machine with the at least one of the other efficiency characteristic or the other productivity characteristic of the second machine; and
operate the first machine to travel along the at least one path.

2. The system first machine of claim 1,
wherein the controller is further to:
calculate, based on the plurality of machine parameters, a distance and a direction traveled by the first machine, and
wherein, when creating the site map, the controller is to:
create the site map based on the distance and the direction traveled.

3. The system first machine of claim 1,
wherein the plurality of machine parameters further include information associated with a mass of the first machine; and
wherein, when determining the geometry and the grade of the plurality of paths, the controller is to:
calculate the grade of the plurality of paths based on the mass of the first machine.

4. The first machine of claim 3,
wherein the plurality of machine parameters further include information associated with:
an engine speed,
a transmission gear, and
a parameter indicating a parasitic load on a drive train of the first machine; and
wherein, when determining the geometry and the grade of the plurality of paths, the controller is further to:
calculate the grade of the plurality of paths further based on the engine speed, the transmission gear, and the parameter indicating the parasitic load.

5. The first machine of claim 1, wherein the controller is further to:
transmit, to the second machine, information associated with the site map and information identifying the at least one of the efficiency characteristic or the productivity characteristic.

6. The first machine of claim 1,
wherein the controller is further to:
determine a change in the at least one of the efficiency characteristic or the productivity characteristic over time, and
wherein the at least one path is selected further based on the change.

7. The first machine of claim 1, wherein the plurality of machine parameters further include information associated with at least one of:
a fuel rate,
a mass of the first machine,
an engine speed,
a transmission gear, or
a parameter indicating a parasitic load associated with a drive train of the first machine.

8. The first machine of claim 1, wherein, when receiving the update to the site map, the controller is to:
receive, from the second machine, the update to the site map.

9. A method comprising:
receiving, by a controller of a first machine and from a plurality of sensors of the first machine, a plurality of machine parameters indicative of sensed operations of the first machine as the first machine travels along a terrain,
wherein the plurality of machine parameters include information associated with one or more of:
a steering parameter of the first machine,
a ground speed of the first machine, or
a payload weight of the first machine;
determining, by the controller and based on the plurality of machine parameters, a geometry and a grade of a plurality of paths on the terrain along which the first machine travels;
creating, by the controller, a map indicating the plurality of paths based on the geometry and the grade;
determining, by the controller, at least one of an efficiency characteristic or a productivity characteristic of the first machine based on the plurality of machine parameters,
the at least one of the efficiency characteristic or the productivity characteristic of the first machine indicating at least one of a fuel efficiency or an amount of payload moved;
receiving an update to the map based on one or more paths on which a second machine travels;
comparing the at least one of the efficiency characteristic or the productivity characteristic of the first machine with at least one of another efficiency characteristic or another productivity characteristic of the second machine;
selecting at least one path, from the plurality of paths, for the first machine to travel along in a future operation based on the update to the map and based on comparing the at least one of the efficiency characteristic or the productivity characteristic of the first machine with the at least one of the other efficiency characteristic or the other productivity characteristic of the second machine; and
operating the first machine to travel along the at least one path.

10. The method of claim 9, wherein the at least one of the efficiency characteristic or the productivity characteristic of the first machine indicates a travel time of the first machine from a load site to a dump site.

11. The method of claim 9, further comprising:
calculating a distance and a direction traveled by the first machine based on the plurality of machine parameters, wherein creating the map comprises:
creating the map based on the distance and the direction traveled.

12. The method of claim 9, further comprising:
updating the map to identify the at least one of the efficiency characteristic or the productivity characteristic of the first machine; and
transmitting information associated with the updated map to an off-board system.

13. The method of claim 9,
wherein the first machine and the second machine are hauling machines,
wherein the at least one path is selected further based on whether a third machine is in a position to be loaded by a fourth machine, and
wherein the fourth machine includes a digging machine.

14. The method of claim 9, wherein the at least one path is selected further based on the first machine being prioritized over the second machine.

15. The method of claim 9, wherein receiving the update to the map comprises:
receiving, from the second machine, the update to the map.

16. A non-transitory computer-readable medium storing instructions, the instructions comprising:
one or more instructions that, when executed by one or more processors, cause the one or more processors to:
receive, from a plurality of sensors of a first machine, a plurality of machine parameters relating to an operation of the first machine as the first machine travels along a terrain,
the plurality of machine parameters including information associated with one or more of:
a steering parameter of the first machine,
a ground speed of the first machine, and
a payload weight of the first machine, and
the operation including fuel injection in an engine of the first machine;
determine, based on the plurality of machine parameters, a geometry and a grade of a plurality of paths on the terrain along which the first machine travels;
create, based on the geometry and the grade, a site map indicating the plurality of paths;
determine, based on the plurality of machine parameters, a characteristic relating to at least one of efficiency or productivity for the first machine,
the characteristic indicating a fuel efficiency or an amount of payload moved;
identify an update to the site map based on one or more paths on which a second machine travels;
compare the characteristic with another characteristic relating to at least one of efficiency or productivity for the second machine;
select at least one path, from the plurality of paths, for the first machine to travel along in a future operation based on the update to the site map and based on comparing the characteristic with the other characteristic; and
operate the first machine autonomously to travel along the at least one path.

17. The non-transitory computer-readable medium of claim 16, wherein the plurality of machine parameters are determined without using a GPS device.

18. The non-transitory computer-readable medium of claim 16, wherein the operation further includes movement or control of a component in the first machine.

19. The non-transitory computer-readable medium of claim 16, wherein the site map is created further based on an initial position of the first machine.

20. The non-transitory computer-readable medium of claim 16, wherein the one or more instructions to identify the update to the site map comprise:
one or more instructions to receive, from the second machine, the update to the site map.

\* \* \* \* \*